(12) United States Patent
Noto

(10) Patent No.: US 8,400,259 B2
(45) Date of Patent: Mar. 19, 2013

(54) ELECTRONIC DEVICE

(75) Inventor: Ryuichiro Noto, Chiba (JP)

(73) Assignee: Sony Corporation, Tokyo (JP)

( * ) Notice: Subject to any disclaimer, the term of this patent is extended or adjusted under 35 U.S.C. 154(b) by 292 days.

(21) Appl. No.: 12/701,785

(22) Filed: Feb. 8, 2010

(65) Prior Publication Data

US 2010/0207779 A1  Aug. 19, 2010

(30) Foreign Application Priority Data

Feb. 18, 2009  (JP) ................................ P2009-035757

(51) Int. Cl.
  *G05B 19/02* (2006.01)
(52) U.S. Cl. .................................... 340/4.37; 340/13.24
(58) Field of Classification Search .................. 340/4.37
  See application file for complete search history.

(56) References Cited

U.S. PATENT DOCUMENTS

2002/0171684 A1* 11/2002 Christianson et al. ........ 345/835
2004/0056837 A1*  3/2004 Koga et al. .................... 345/156
2009/0251609 A1* 10/2009 Almeida ........................ 348/569

FOREIGN PATENT DOCUMENTS

JP  2005-150921 A  6/2005
JP  2007-274295 A  10/2007

* cited by examiner

*Primary Examiner* — Brian Zimmerman
*Assistant Examiner* — Omer S Khan
(74) *Attorney, Agent, or Firm* — Wolf, Greenfield & Sacks, P.C.

(57) ABSTRACT

An electronic device includes: a main unit operable by remote control using a remote controller, wherein the main unit includes a display section having a display screen, a main unit operation section performing input operation, and a main unit control section which performs both control operation corresponding to the operation of the main unit operation section and control operation corresponding to the operation of the remote controller, and the main unit control section displays a first guide screen for guiding the operation of the main unit operation section on the display screen as a first guide operation when detecting that the main unit operation section has been operated, and displays a second guide screen for guiding the operation of the remote controller on the display screen as a second guide operation when detecting that the remote controller has been operated.

8 Claims, 13 Drawing Sheets

ELECTRONIC DEVICE

CROSS REFERENCE TO RELATED APPLICATIONS

This application claims priority under 35 U.S.C. §119 to Japanese Priority Patent Application JP 2009-035757 filed in the Japan Patent Office on Feb. 18, 2009, the entire contents of which are hereby incorporated by reference.

BACKGROUND OF THE INVENTION

1. Field of the Invention

The present invention relates to an electronic device.

2. Description of the Related Art

An electronic device such as an audio unit mounted on a car as a device including a main unit operable by remote control using a remote controller is known.

This type of electronic device can be operated using a main unit operation section provided on the main unit, and the main unit can be controlled using the remote controller for remote control.

In the field of this electronic device, such a technology has been proposed which displays explanation for the functions of operation buttons of the remote controller on a display section provided on the main unit as a help screen (see JP-A-9-130695).

SUMMARY OF THE INVENTION

According to the related-art electronic device, the structures and positions of the operation buttons and operation components provided on the main unit operation section are different from those on the remote controller. In this case, different operation methods are used for the main unit operation section and for the remote controller, which complicates the operation methods and causes operation errors in some cases.

However, the related-art electronic device can only show the functions of the operation buttons on the remote controller and does not provide sufficient solution for these problems.

Thus, it is desirable to provide an electronic device which achieves improvement over maneuverability of a main unit operation section and a remote controller included in the electronic device.

An electronic device according to an embodiment of the invention includes a main unit operable by remote control using a remote controller. The main unit includes a display section having a display screen, a main unit operation section performing input operation, and a main unit control section which performs both control operation corresponding to the operation of the main unit operation section and control operation corresponding to the operation of the remote controller. The main unit control section displays a first guide screen for guiding the operation of the main unit operation section on the display screen as a first guide operation when detecting that the main unit operation section has been operated, and displays a second guide screen for guiding the operation of the remote controller on the display screen as a second guide operation when detecting that the remote controller has been operated.

According to the embodiment of the present invention, the first guide screen for guiding the operation of the main unit operation section and the second guide screen for guiding the operation of the remote controller are displayed.

Thus, a user can accurately operate both the main unit operation section and the remote controller without losing comprehension of the operation method and making errors of the operation. Accordingly, the maneuverability improves.

DESCRIPTION OF THE PREFERRED EMBODIMENT

An embodiment according to the invention is hereinafter described with reference to FIGS. 1 through 13.

In this embodiment, an electronic device 10 as a car audio device incorporated in a car room is discussed.

Figure 1:
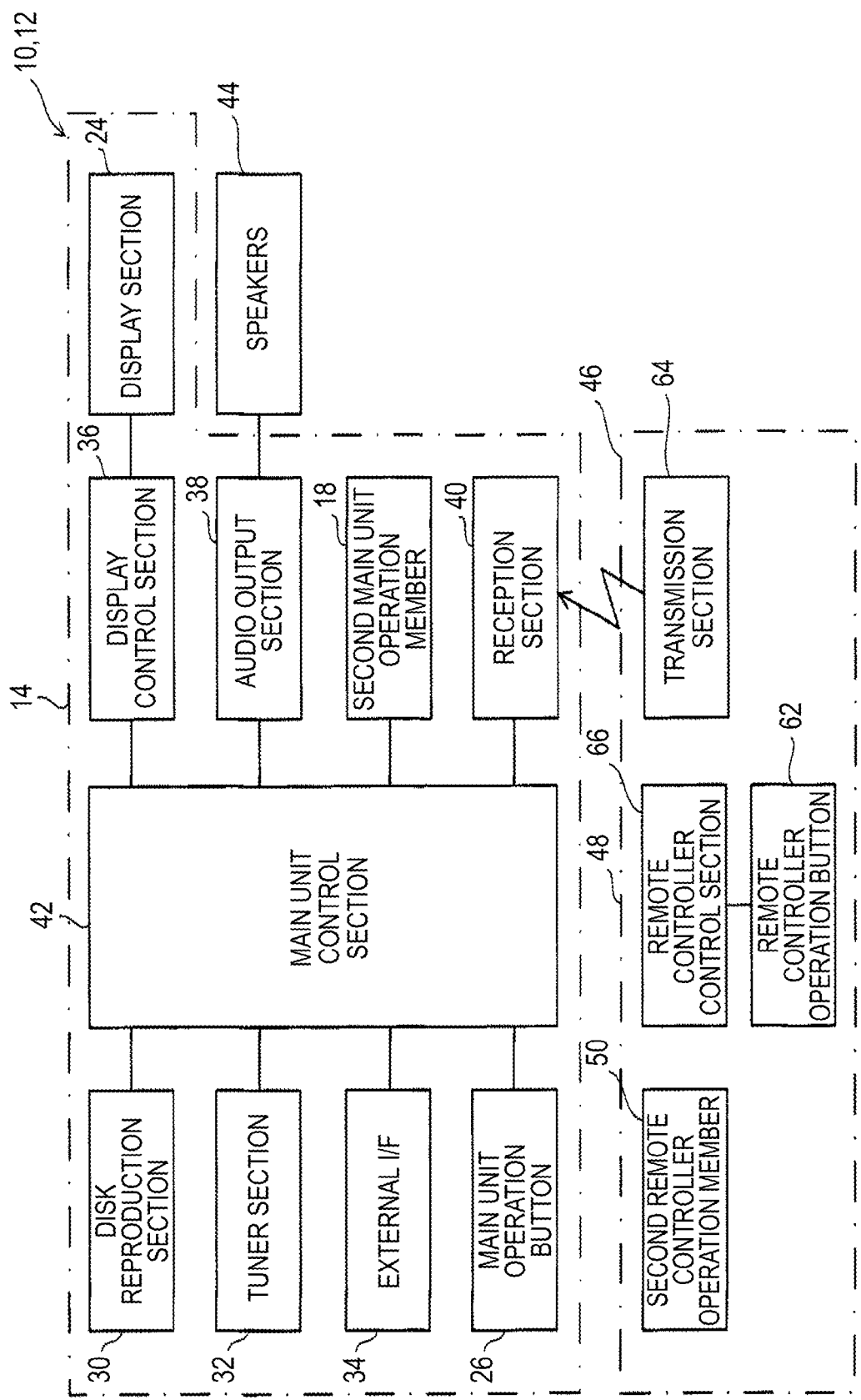
FIG. 1 is a block diagram showing structures of an electronic device 10 and a remote controller 46.

As shown in FIG. 1, the electronic device 10 includes a main unit 12 incorporated in a dashboard or the like inside the car room, and speakers 44 connected with the main unit 12 and disposed at appropriate positions inside the car room.

According to this embodiment, the speakers 44 are provided at four positions on the left and right regions of the front area and on the left and right regions of the rear area of the car room.

The main unit 12 is operable by remote control using a remote controller 46.

Figure 2:
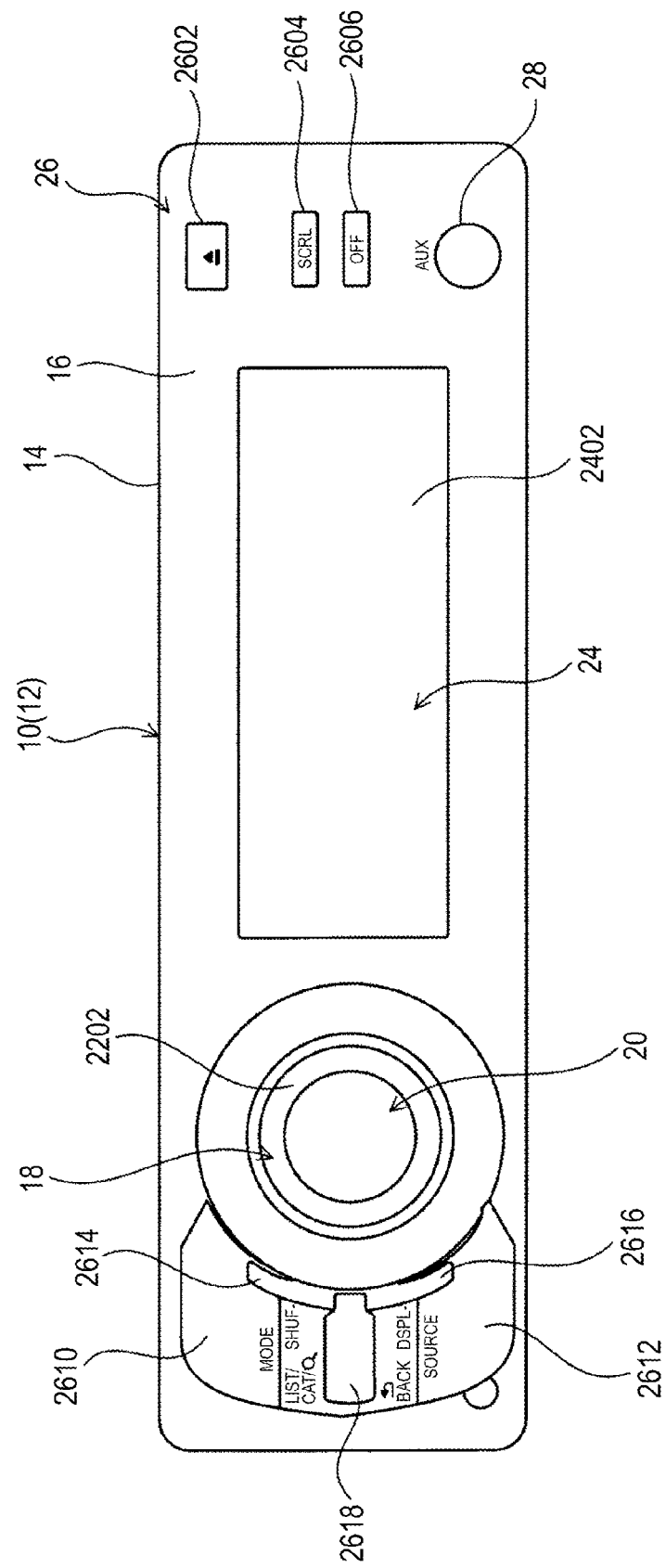
FIG. 2 is a front view of the electronic device 10.

As illustrated in FIG. 2, the main unit 12 has a housing 14.

The housing 14 has a rectangular plate shape having a height, and a width and a length larger than the height.

A second main unit operation member 18 is provided on the left part of a front surface 16 of the housing 14.

The second main unit operation member 18 is a component through which input operation is inputted. Various setting items listed on a sound setting menu screen described later (that is, displayed for selection on the sound setting menu screen) are selected via the second main unit operation member 18.

The second main unit operation member 18 has a dial 20.

Figure 3:
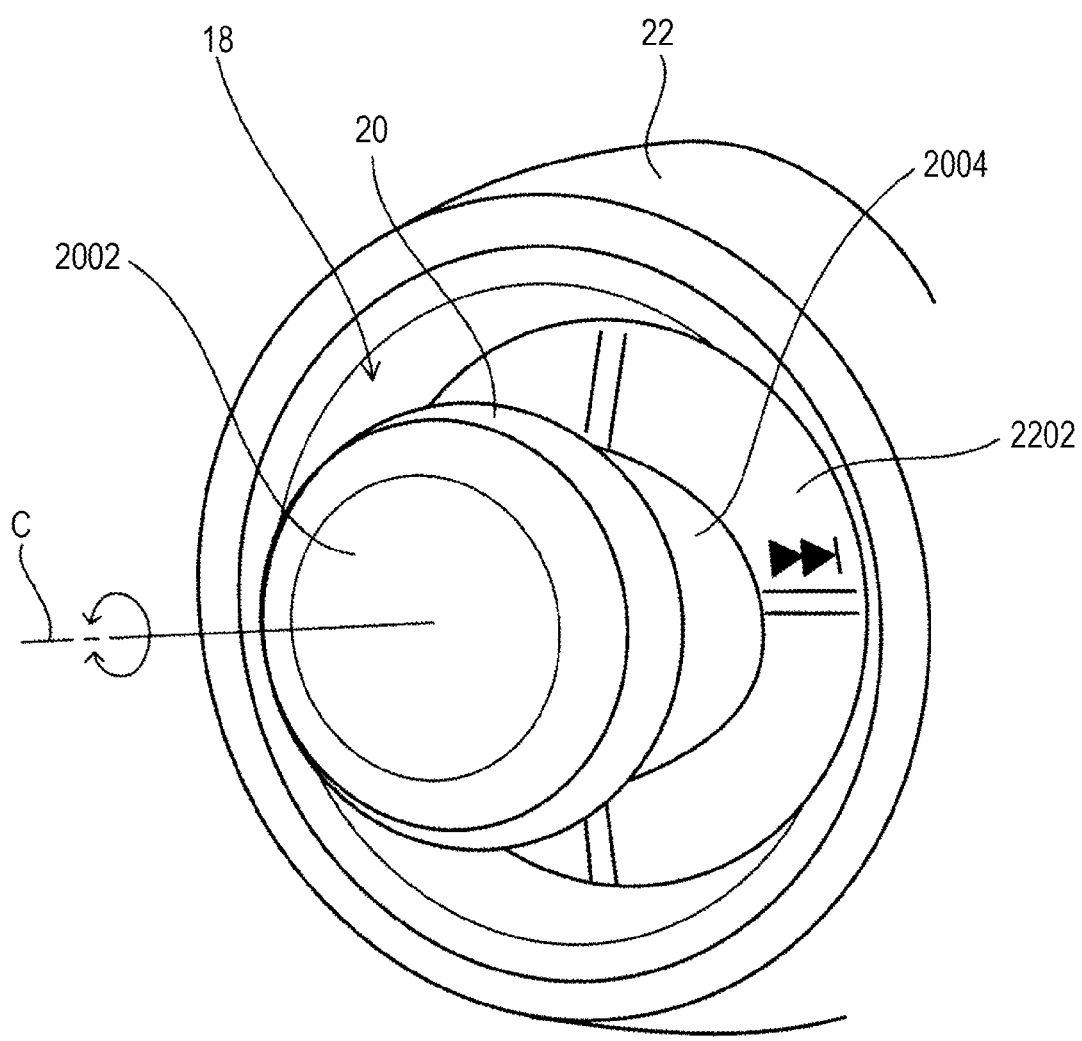
FIG. 3 is a perspective view of a second main unit operation member 18.

As illustrated in FIG. 3, the dial 20 has a disk-shaped front surface 2002, and a side surface 2004 connected with the front surface 2002.

The dial 20 can be rotated clockwise and anticlockwise (in normal and reverse directions) around a center axis C of the dial 20, and pressed toward the rear along the center axis C.

The second main unit operation member 18 has a not-shown sensor (encoder) for detecting the rotation direction and the rotation amount of the dial 20, and a not-shown sensor (switch) for detecting whether the dial 20 has been pressed or not.

In other words, the second main unit operation member 18 has a lever which can be rotated and pressed.

As illustrated in FIG. 3, a cylindrical wall 22 is concentrically formed around the center axis C in such a manner as to surround the outer circumference of the dial 20.

An annular bottom surface 2202 is formed on the bottom of the cylindrical wall 22 around the dial 20.

As illustrated in FIG. 2, a display section 24 is provided on the right side of the second main unit operation member 18.

The display section 24 has a rectangular display screen 2402 which extends in the width direction and faces the front of the front surface 16.

The display section 24 can display characters, symbols, images and the like. The display section 24 may be a liquid crystal display, an organic EL display, or other various known displays.

As illustrated in FIG. 2, a disk eject button 2602, a scroll button 2604, and an off button 2606 are provided as main unit operation buttons 26 on the right part of the front surface 16.

The disk eject button 2602 is an operation button operated for taking out a disk-shaped recording medium such as a CD and a DVD from a disk reproduction section 30 (FIG. 1).

The scroll button 2604 is an operation button operated for scrolling a long string of characters not displayed on the display screen 2402 at a time.

The off button 2606 is operated for turning off a power source of the electronic device 10.

FIG. 2 shows an input connector 28 to which contents data supplied from an external device such as a portable music player is inputted.

Moreover, a mode button 2610, a source button 2612, a shuffle button 2614, a display button 2616, a menu button 2618, and other buttons of the operation buttons 26 are provided on the left side of the second main unit operation member 18.

The mode button 2610 is an operation button for switching between AM broadcasting and FM broadcasting at the reception of radio broadcasting by using a tuner section 32 (FIG. 1).

The source button 2612 is an operation button for switching between reproduction of the disk-shaped recording medium such as a CD and a DVD by using the disk reproduction section 30 (FIG. 1), audience of radio broadcasting by using the tuner section 32 (FIG. 1), and reproduction of the contents data of the external device.

The shuffle button 2614 is an operation button for determining whether shuffle reproduction of the disk-shaped recording medium is performed or not.

The display button 2616 is an operation button for switching the display screen of the display section 24.

The menu button 2618 is an operation button for accessing and displaying a sound setting menu screen described later on the display screen 2402.

According to this embodiment, the menu button 2618 is included in a first main unit operation member for displaying a menu screen listing various setting items on the display section.

The menu button 2618 and the second main unit operation member 18 are included in a main unit operation section according to the embodiment of the present invention.

As shown in FIG. 1, the main unit 12 further includes the disk reproduction section 30, the tuner section 32, an external interface 34, a display control section 36, an audio output section 38, a reception section 40, and a main unit control section 42, and other components.

The disk reproduction section 30 reproduces contents data such as music recorded on a disk-shaped recording medium such as a CD and a DVD and produces audio signals.

The tuner section 32 receives radio waves transmitted from a radio station and produces audio signals.

The external interface 34 receives contents data supplied from the external device connected with the input connector 28.

The display control section 36 controls operation of the display section 24 based on image data supplied from the main unit control section 42 to display characters, symbols, images and the like on the display screen 2402.

The audio output section 38 receives audio signals supplied from the disk reproduction section 30, the tuner section 32, and the external interface 34 via the main unit control section 42, processes or amplifies the received audio signals, and supplies the resultant audio signals to the speakers 44. As a result, audio sounds are emitted from the speakers 44.

The reception section 40 receives remote control signals transmitted from a transmission section 64 of the remote controller 46, and supplies control commands obtained by decoding the remote control signals to the main unit control section 42.

The remote control signals transmitted from the transmission section 64 are wireless signals which may be known wireless signals such as infrared signals.

The main unit control section 42 has a microcomputer which includes a CPU, a ROM storing a control program and the like, a RAM providing a working area, an interface unit interfacing with peripheral circuits, and other sections connected with one another via buses, for example. The main unit control section 42 functions under the control program performed by the CPU.

The main unit control section 42 controls the disk reproduction section 30, the tuner section 32, the display control section 36, and the audio output section 38 according to the operation input received from the second main unit operation member 18 and the main unit operation buttons 26.

Also, the main unit control section 42 controls the disk reproduction section 30, the tuner section 32, the display control section 36, and the audio output section 38 according to the remote control signals (control commands) supplied from the reception section 40.

Figure 4:
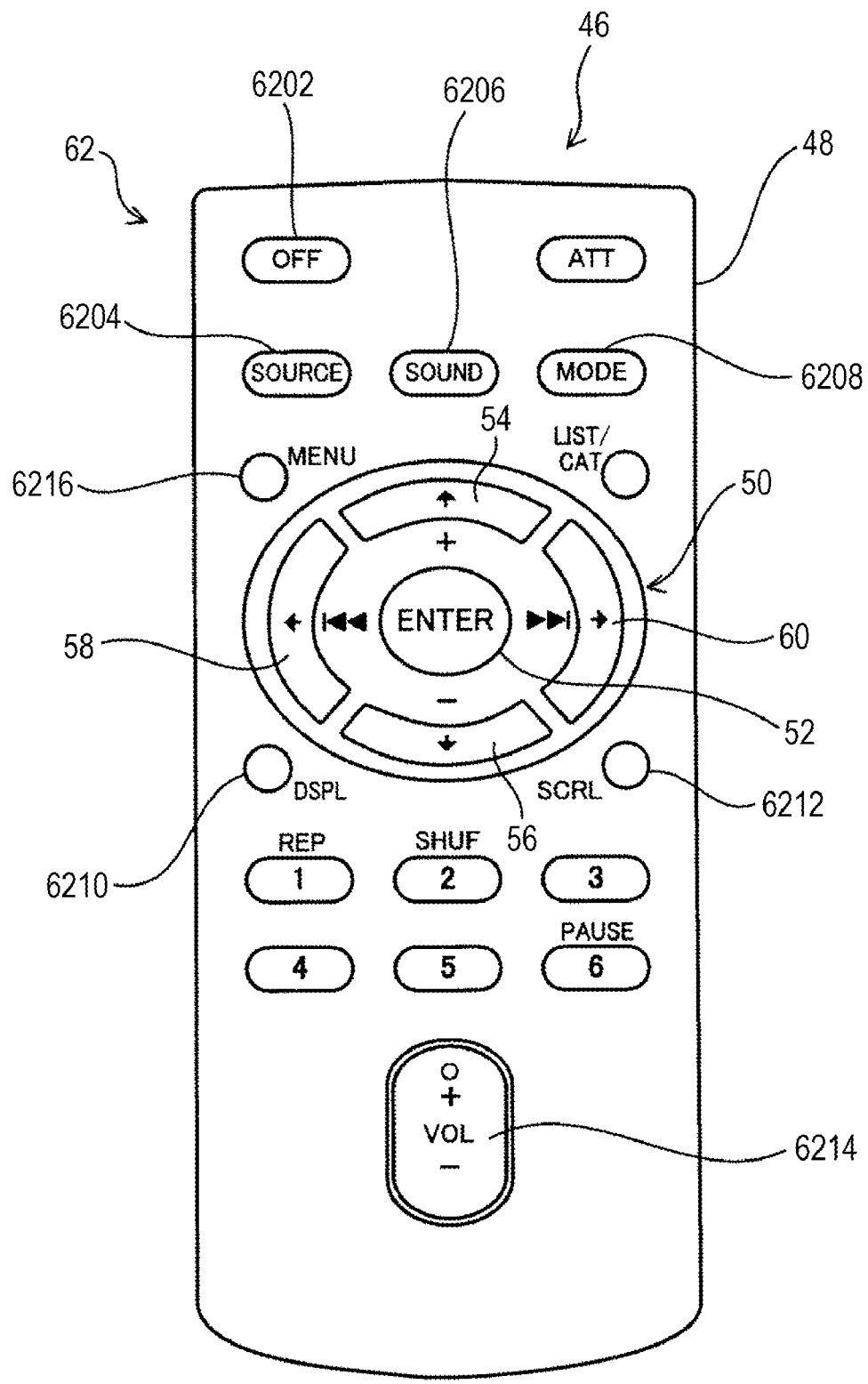
FIG. 4 is a plan view of a remote controller 46.

As shown in FIG. 4, the remote controller 46 has a housing 48 having a rectangular plate shape.

A second remote controller operation member 50 is provided on one of the surfaces of the housing 48 in the thickness direction of the housing 48.

The second remote controller operation member 50 is a section through which input operation is inputted.

According to this embodiment, the second remote controller operation member 50 includes five press buttons of a decision button 52, an up-arrow button 54, a down-arrow button 56, a left-arrow button 58, and a right-arrow button 60. The up-arrow button 54, the down-arrow button 56, the left-arrow button 58, and the right-arrow button 60 are disposed in such positions as to surround the decision button 52.

The second remote controller operation member 50 is a section for receiving input operation as a section for selecting various setting items listed on a sound setting menu screen described later (that is, displayed on the sound setting menu screen for selection).

Remote controller operation buttons 62 are further provided on the surface of the housing 48.

The remote controller operation buttons 62 are sections through which input operation is inputted.

According to this embodiment, the remote controller operation buttons 62 include an off button 6202, a source button 6204, a sound button 6206, a mode button 6208, a display button 6210, and a scroll button 6212. The remote controller operation buttons 62 further include a sound volume control button 6214, a menu button 6216 and the like.

The off button 6202 is operated for turning off the power source of the electronic device 10 similarly to the off button 2606.

The source button 6204 is an operation button for switching the reproduction source of the electronic device 10 similarly to the source button 2612.

The sound button 6206 is an operation button operated for setting sound quality and the like.

The mode button 6208 is an operation button for switching between AM broadcasting and FM broadcasting similarly to the mode button 2610.

The display button 6210 is an operation button for switching the display screen of the display section 24 similarly to the display button 2616.

The scroll button 6212 is an operation button for scrolling a long string of characters not displayed on the display screen 2402 at a time similarly to the scroll button 2604.

The sound volume control button 6214 is an operation button operated for increasing or decreasing the sound volume of the speakers 44.

The menu button 6216 is an operation button for accessing and displaying the sound setting menu screen described later on the display screen 2402.

According to this embodiment, the menu button 6216 is included in a first controller operation member for displaying a menu screen listing various setting items on the display section.

The menu button 6216 and the second remote controller operation member 50 are included in a remote controller operation section according to the embodiment of the present invention.

As shown in FIG. 1, the remote controller 46 further includes the transmission section 64, a remote controller control section 66, and other components.

The remote controller control section 66 has a microcomputer which includes a CPU, a ROM storing a control program and the like, a RAM providing a working area, an interface unit interfacing with peripheral circuits, and other sections connected with one another via buses, for example. The remote controller control section 66 functions under the control program performed by the CPU.

The remote controller control section 66 supplies control commands corresponding to operation input inputted through the second remote controller operation member 50 and the remote controller operation buttons 62 to the transmission section 64.

The transmission section 64 produces remote control signals based on the control commands supplied from the remote controller control section 66, that is, produces remote control signals by coding the control commands, and transmits the remote control signals to the reception section 40.

The second main unit operation member 18 and the second remote controller operation member 50 are now explained.

The second main unit operation member 18 and the second remote controller operation member 50 are operated for selecting and determining one selection item from a plurality of selection items contained in a menu screen displayed on the display screen 2402.

As described above, the second main unit operation member 18 and the second remote controller operation member 50 have different structures, and thus different operation methods are used for the second main unit operation member 18 and for the second remote controller operation member 50.

Moreover, the type of operation method allowed for selecting and determining one selection item from the plural selection items contained in the menu screen differs according to the menu screen.

Thus, in case of the second main unit operation member 18 which allows rotational operations in the normal and reverse directions and press operation using the dial 20, the effective operations of these operations differ according to the menu screen.

Also, in case of the second remote controller operation member 50 which allows operations of the decision button 52 and the four arrow buttons 54, 56, 58, and 60, the effective operation buttons of the five operation buttons differ according to the menu screen.

According to this embodiment, therefore, the main unit control section 42 displays a first guide screen which shows the effective operation method for operating the main unit operation section on the display screen 2402 as a first guide operation when the main unit operation section is operated.

On the other hand, the main unit control section 42 displays a second guide screen which shows the effective operation method for operating the second remote controller operation member 50 as a second guide operation when the second remote controller operation member 50 is operated.

The details of the operation of the electronic device 10 according to this embodiment are now described.

The operation of sound setting menu in the various setting menu is described as follows.

Figure 5:
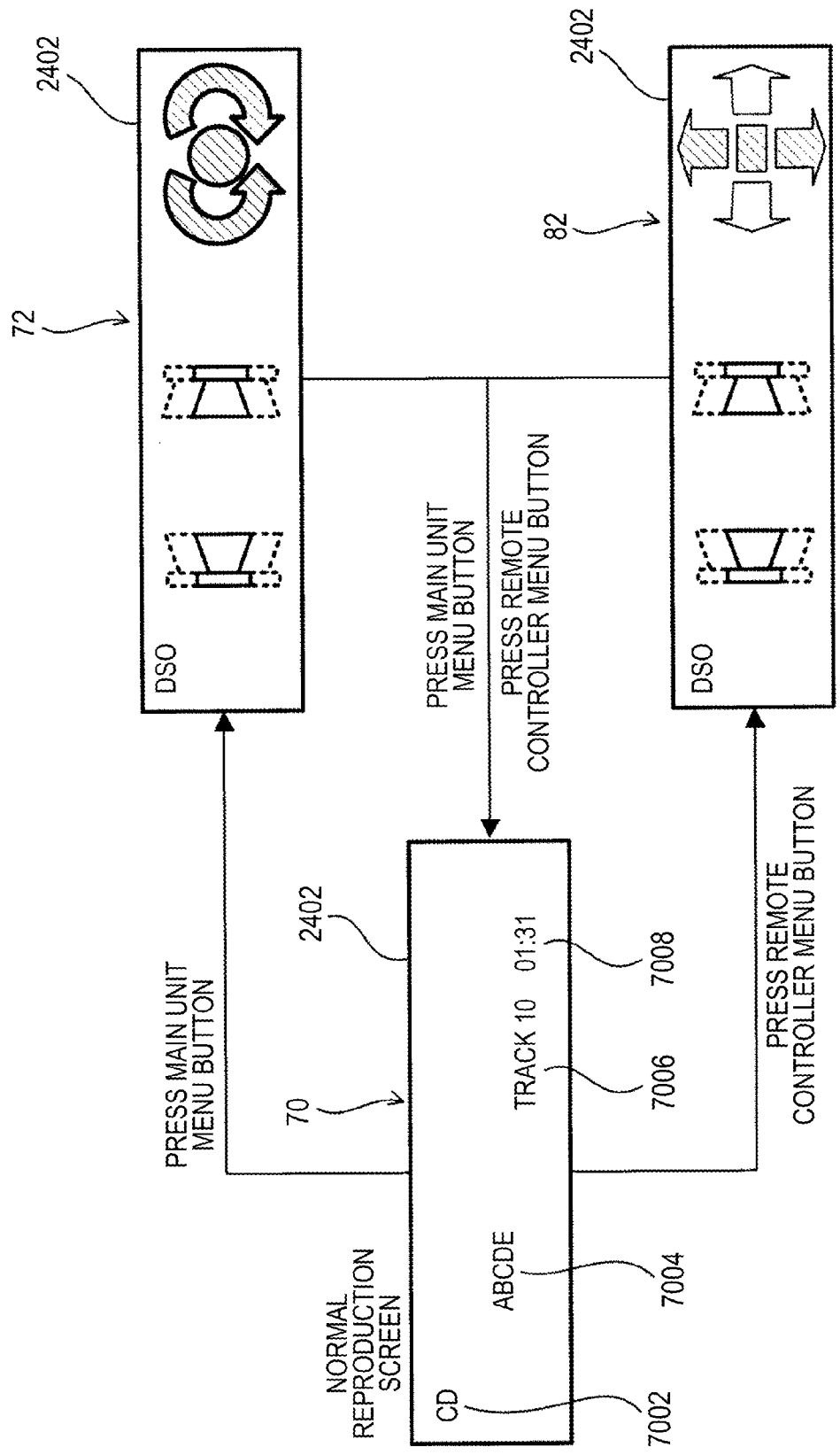
FIG. 5 illustrates switches between a normal reproduction screen, a main unit sound setting menu screen 72, and a remote controller sound setting menu screen 82.

As shown in FIG. 5, a CD reproduction display screen 70 is displayed on the display screen 2402 while a CD is reproduced, for example.

The CD reproduction display screen 70 displays an icon or character 7002 indicating that the CD is the source (sound source), a music title 7004, a track number 7006, a reproduction elapsed time 7008, and others.

When the main unit control section 42 detects press of the menu button 2618 on the main unit 12 with the CD reproduction display screen 70 displayed, the main unit control section 42 displays a main unit sound setting screen 72 on the display screen 2402.

When the main unit control section 42 again detects press of the menu button 2618 on the main unit 12 under this condition, the main unit control section 42 displays the CD reproduction display screen 70 on the display screen 2402.

When the main unit control section 42 detects press of the menu button 6216 on the remote controller 46 with the CD reproduction display screen 70 displayed, the main unit control section 42 displays a remote controller sound setting menu screen 82 on the display screen 2402.

When the main unit control section 42 again detects press of the menu button 6216 on the remote controller 46 under this condition, the main unit control section 42 displays the CD reproduction display screen 70 on the display screen 2402.

The main unit sound setting menu screen 72 and the remote controller sound setting menu screen 82 are menu screens listing various setting items.

(Main Unit Sound Setting Menu Screen 72)

Operation under display of the main unit sound setting menu screen 72 is now described.

Figure 6:
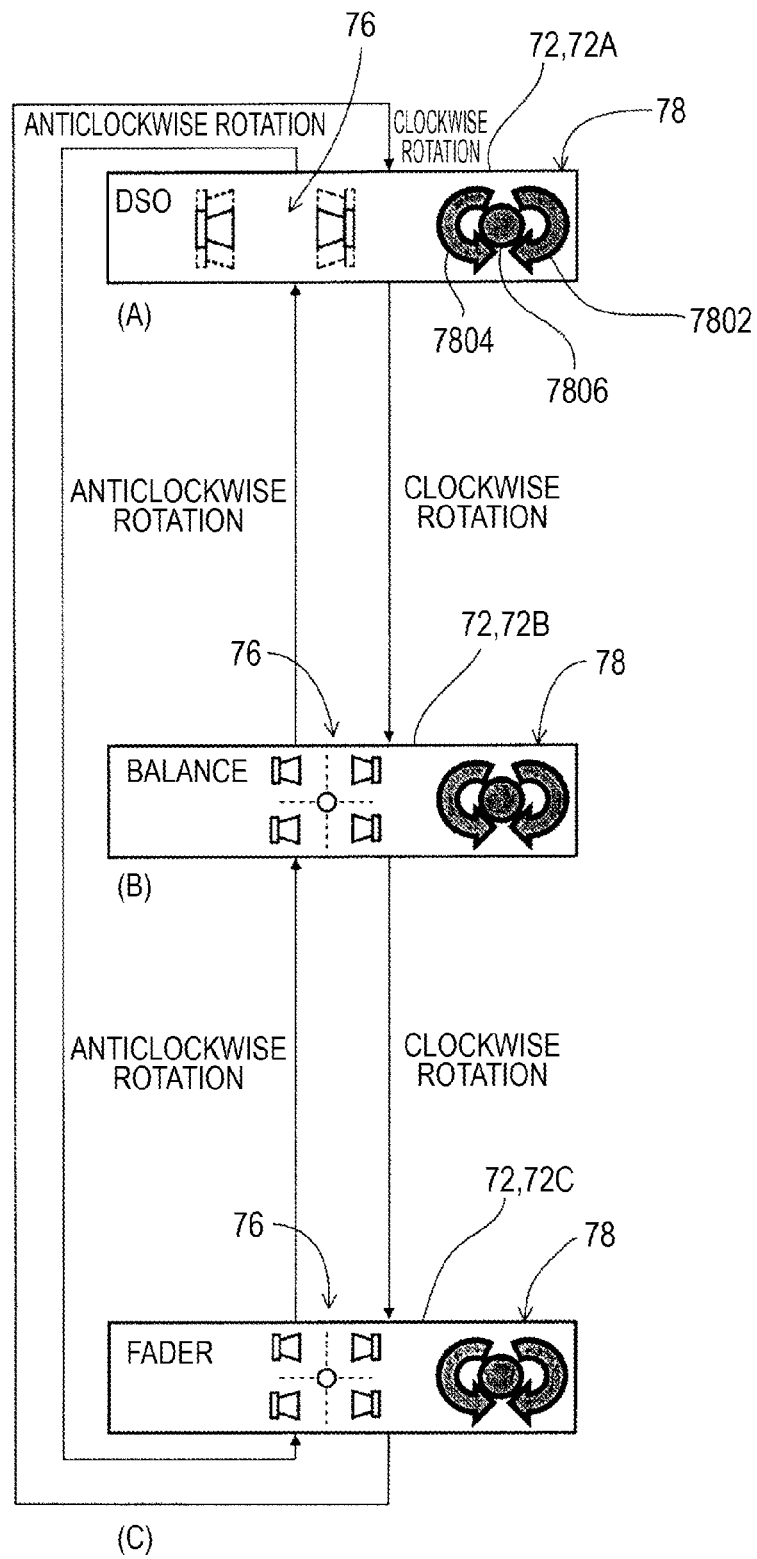
FIG. 6 illustrates switches of the main unit sound setting menu screen 72, showing conditions (A) through (C).

As shown in FIG. 6, the main unit sound setting menu screen 72 includes three screens of a (A) DSO setting screen 72A, a (B) balance setting screen 72B, and a (C) fader setting screen 72C.

According to this embodiment, the main unit control section 42 displays the DSO setting screen 72A on the display screen 2402 as the main unit sound setting menu screen 72 when detecting press of the menu button 2618.

(DSO Setting Screen 72A)

Initially, the DSO setting screen 72A is explained.

The DSO setting screen 72A is a screen for determining setting associated with sound field correction which provides such a condition that sounds can be heard as if they are emitted from a virtual speaker positioned on the dashboard by processing audio signals given from the audio output section 38 to the speakers 44.

More specifically, the DSO setting screen 72A is a screen for setting three levels of the sound field correction effect (selecting parameters of DSO).

Figure 7:
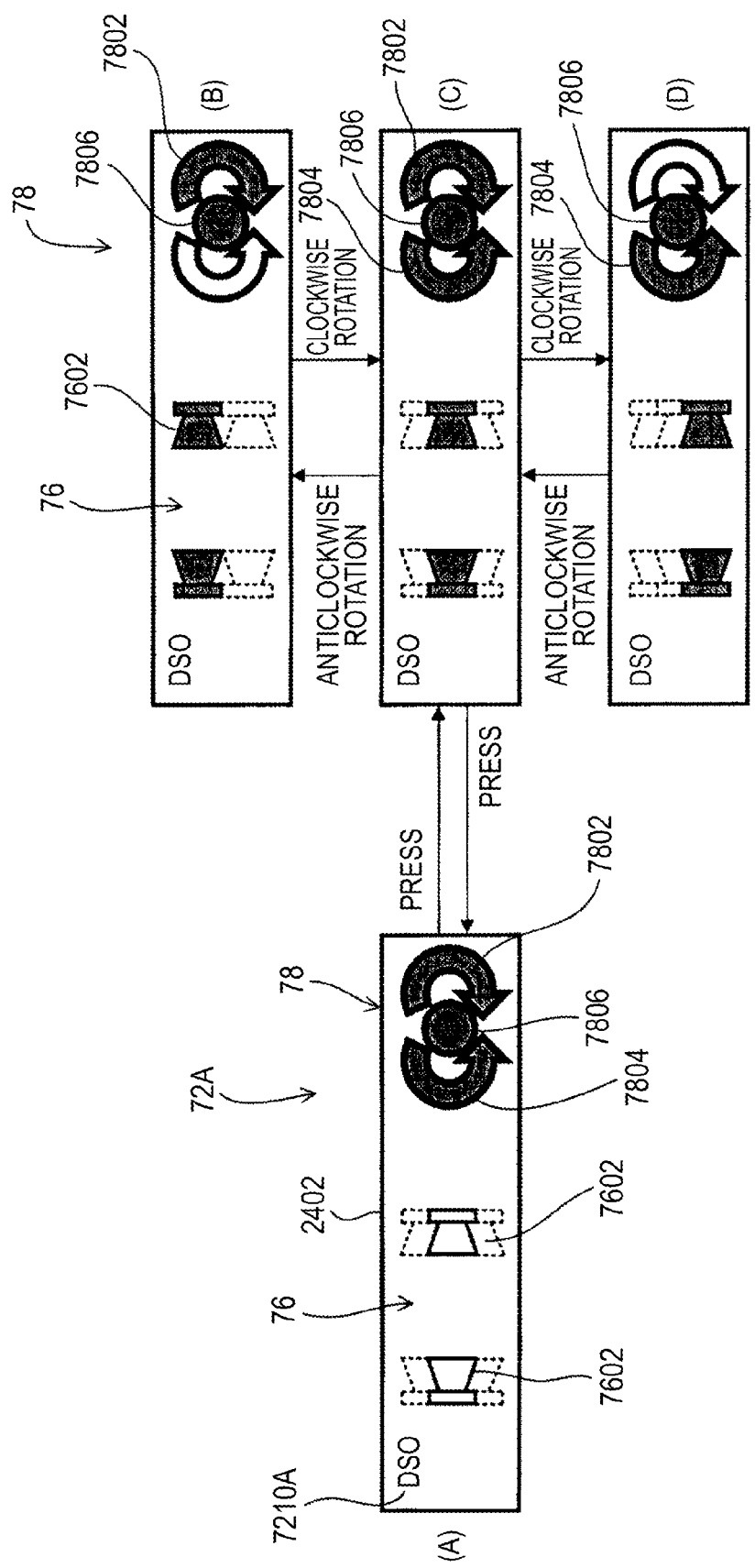
FIG. 7 illustrates switches of a DSO setting screen 72A of the main unit sound setting menu screen 72, showing conditions (A) through (D).

As shown in FIG. 7, the DSO setting screen 72A includes a setting contents display portion 76 and an operation display portion 78. The figure shows a character 7210A indicating that the DSO setting screen 72A is displayed on the display screen 2402.

The DSO setting screen 72A shows the details of the setting contents of the sound field correction.

More specifically, the setting contents display portion 76 displays the setting contents of the sound field correction on the DSO setting screen 72A by using a setting icon 7602 having a shape of speakers.

A condition (A) in FIG. 7 shows the setting contents display portion 76 which does not show the setting icon 7602. In other words, this condition shows the condition in which the setting icon 7602 has the same color as that of the background of the setting contents display portion 76 (gray-out).

The condition not showing the setting icon 7602 indicates that not the DSO parameter but the main unit sound setting menu screen 72 is being selected, that is, that one of the three screens of the DSO setting screen 72A, the balance setting screen 72B, and the fader setting screen 72C is being selected.

Each of conditions (B), (C), and (D) in FIG. 7 shows the setting contents display portion 76 showing the setting icon 7602. That is, each of these conditions shows the condition in which the setting icon 7602 having a color different from that of the background of the setting contents display portion 76 is shown.

The condition showing the setting icon 7602 indicates that DSO parameter selection is effective.

As illustrated in the conditions (B), (C), and (D) in FIG. 7, the level of the correction effect can be displayed by the position of the setting icon 7602 shown on the DSO setting screen 72A in the up-down direction.

More specifically, the conditions (B), (C), and (D) in FIG. 7 show the high level, middle level, and low level of the correction effect, respectively.

The operation display portion 78 indicates which of the three operations of clockwise rotation operation, anticlockwise rotation operation, and press operation of the dial 20 of the second main unit operation member 18 is effective by using arrow icons 7802 and 7804 and a circle icon 7806.

More specifically, the operation of the second main unit operation member 18 corresponding to the shown icon of the icons 7802, 7804, and 7806 on the operation display portion 78 is effective, and the operation of the second main unit operation member 18 corresponding to the not-shown icon is ineffective.

In FIGS. 6 through 9, the hatched icons 7802, 7804, and 7806 indicate that they are shown, and the not-hatched icons 7802, 7804, and 7806 indicate that they are not shown.

Thus, when all of the three icons 7802, 7804, and 7806 are shown as illustrated in the condition (A) in FIG. 7, all of the three operations of the clockwise rotation operation, the anticlockwise rotation operation, and the press operation are effective.

When the clockwise arrow icon 7802 and the circle icon 7806 are shown as illustrated in the condition (B) in FIG. 7, the two operations of the clockwise rotation operation and the press operation are effective. In this case, the anticlockwise rotation operation is ineffective.

When all of the three icons 7802, 7804, and 7806 are shown as illustrated in the condition (C) in FIG. 7, all of the three operations of the clockwise rotation operation, the anticlockwise rotation operation, and the press operation are effective similarly to the condition (A) in FIG. 7.

When the anticlockwise arrow icon 7804 and the circle icon 7806 are shown as illustrated in the condition (D) in FIG. 7, the two operations of the anticlockwise rotation operation and the press operation are effective. In this case, the clockwise rotation operation is ineffective.

When the dial 20 is pressed under the display condition of the condition (A) in FIG. 7, the condition switches to the display condition of the condition (C) in FIG. 7. In this case, the level of the sound field correction effect shown by the setting icon 7602 is "middle".

In the display condition of the condition (C) in FIG. 7, all of the three operations of the clockwise rotation operation, the anticlockwise rotation operation, and the press operation of the dial 20 are effective.

When the dial 20 is pressed in this condition, the level of the sound field correction effect is set at "middle".

When the dial 20 is rotated clockwise in the display condition of the condition (C) in FIG. 7, the condition switches to the display condition of the condition (D) in FIG. 7. In this case, the level of the sound field correction effect shown by the setting icon 7602 is "low".

In the display condition of the condition (D) in FIG. 7, the two operations of the anticlockwise operation and the press operation are effective.

When the dial 20 is pressed under this condition, the sound field correction effect is set at "low".

When the dial 20 is rotated anticlockwise, the condition switches to the condition (C) in FIG. 7.

When the dial 20 is rotated anticlockwise in the display condition of the condition (C) in FIG. 7, the condition switches to the display condition of the condition (B) in FIG. 7. In this case, the level of the sound field correction effect shown by the setting icon 7602 is "high".

In the display condition of the condition (B) in FIG. 7, the two operations of the clockwise rotation operation and the press operation are effective.

When the dial 20 is pressed in this condition, the level of the sound field correction effect is set at "high".

When the dial 20 is rotated clockwise, the condition switches to the condition (C) in FIG. 7.

(Balance Setting Screen 72B)

The balance setting screen 72B is now explained.

When the dial 20 is rotated clockwise under the condition that the three icons 7802, 7804, and 7806 are shown on the DSO setting screen 72A and that the setting icon 7602 (FIG.

7) is not selected, the screen display switches from the DSO setting screen 72A to the balance setting screen 72B as shown in FIG. 6.

When the dial 20 is rotated anticlockwise under the condition that all of the three icons 7802, 7804, and 7806 are shown on the balance setting screen 72B and that a setting icon 7612 (FIG. 8) is not selected, the screen display switches from the balance setting screen 72B to the DSO setting screen 72A.

The balance setting screen 72B is a screen for setting the left-right sound volume balance (selecting the parameter of the left-right sound volume balance) by processing audio signals given from the audio output section 38 to the speakers 44.

More specifically, the balance setting screen 72B is a screen for controlling the left-right sound volume balance and setting the controlled balance. The left-right sound volume balance may be controlled in three levels or more, or may be controlled with no steps.

Figure 8:
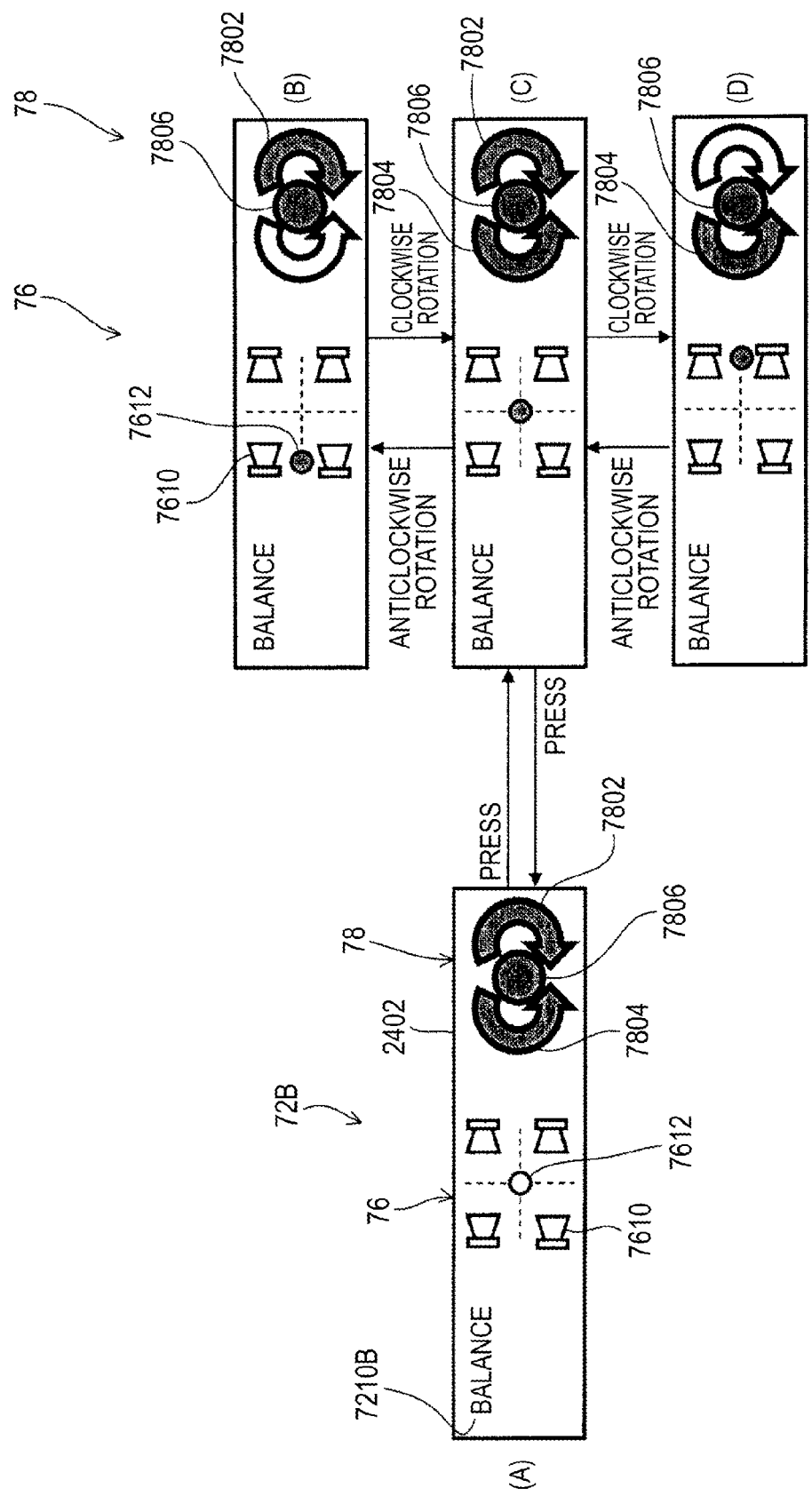
FIG. 8 illustrates switches of a balance setting screen 72B of the main unit sound setting menu screen 72, showing conditions (A) through (D).

As illustrated in FIG. 8, the balance setting screen 72B includes the setting contents display portion 76 and the operation display portion 78. The figure shows a character 7210B indicating that the balance setting screen 72B is shown on the display screen 2402.

The balance setting screen 72B displays the details of the setting contents of the left-right sound volume balance.

More specifically, the setting contents display portion 76 on the balance setting screen 72B indicates the setting contents of the left-right sound volume balance by using a setting icon 7610 having a shape of four speakers on the front, rear, left and right, and a setting icon 7612 representing the sound volume balance.

A condition (A) in FIG. 8 shows a condition not showing the setting icon 7612 representing the sound volume balance on the setting contents display portion 76.

The condition not showing the setting icon 7612 representing the sound volume balance indicates that not a left-right sound volume balance parameter selection screen but the main unit sound setting menu screen 72 is being selected, that is, the three screens of the DSO setting screen 72A, the balance setting screen 72B, and the fader setting screen 72C are being selected.

Each of conditions (B), (C), and (D) in FIG. 8 shows the display condition of the setting icon 7612 representing the sound volume balance on the setting contents display portion 76.

The display of the setting icon 7612 representing the sound volume balance in this manner notifies that the sound volume balance control setting is allowed.

As illustrated in the conditions (B), (C), and (D) in FIG. 8, the left-right sound volume balance is indicated by the position of the setting icon 7612 representing the sound volume balance in the left-right direction and displayed on the balance setting screen 72B.

The display contents of the operation display portion 78 are similar to those shown in FIG. 7.

When the dial 20 is pressed in the display condition of the condition (A) in FIG. 8, the condition switches to the display condition of the condition (C) in FIG. 8. In this case, the sound volume balance indicated by the setting icon 7612 representing the sound volume balance is positioned at the center.

The display condition of the condition (C) in FIG. 8 shows that all of the three operations of the clockwise rotation operation, the anticlockwise rotation operation, and the press operation of the dial 20 are effective.

When the dial 20 is pressed in this condition, the sound volume balance positioned at the center is set.

When the dial 20 is rotated clockwise in the display condition of the condition (C) in FIG. 8, the condition switches to the display condition of the condition (D) in FIG. 8. In this case, the sound volume balance indicated by the setting icon 7612 representing the sound volume balance is positioned on the right side.

The display condition of the condition (D) in FIG. 8 indicates that the two operations of the anticlockwise rotation operation and the press operation are effective.

When the dial 20 is pressed in this condition, the sound volume balance positioned on the right side is set.

When the dial 20 is rotated anticlockwise, the condition switches to the display condition of the condition (C) in FIG. 8.

When the dial 20 is rotated anticlockwise in the display condition of the condition (C) in FIG. 8, the condition switches to the display condition of the condition (B) in FIG. 8. In this case, the sound volume balance indicated by the setting icon 7612 representing the sound volume balance is positioned on the left side.

The display condition of the condition (B) in FIG. 8 indicates that the two operations of the clockwise rotation operation and the press operation are effective.

When the dial 20 is pressed in this condition, the sound volume balance positioned on the left side is set.

When the dial 20 is rotated clockwise, the condition switches to the display condition of the condition (C) in FIG. 8.

(Fader Setting Screen 72C)

The fader setting screen 72C is now explained.

When the dial 20 is rotated clockwise under the condition that all of the three icons 7802, 7804, and 7806 are shown on the balance setting screen 72B, the screen display switches from the balance setting screen 72B to the fader setting screen 72C as shown in FIG. 6.

When the dial 20 is rotated anticlockwise under the condition that all of the three icons 7802, 7804, and 7806 are shown on the fader setting screen 72C, the screen display switches from the fader setting screen 72C to the balance setting screen 72B.

When the dial 20 is rotated clockwise under the condition that all of the three icons 7802, 7804, and 7806 are shown on the fader setting screen 72C, the screen display switches from the fader setting screen 72C to the DSO setting screen 72A.

The fader setting screen 72C is a screen for setting the front-rear sound volume balance (selecting the parameter of the front-rear sound volume balance) by processing audio signals given from the audio output section 38 to the speakers 44.

More specifically, the fader setting screen 72C is a screen for controlling the front-rear sound volume balance and setting the controlled sound volume balance. The front-rear sound volume balance may be controlled in three levels or more, or may be controlled with no step.

Figure 9:
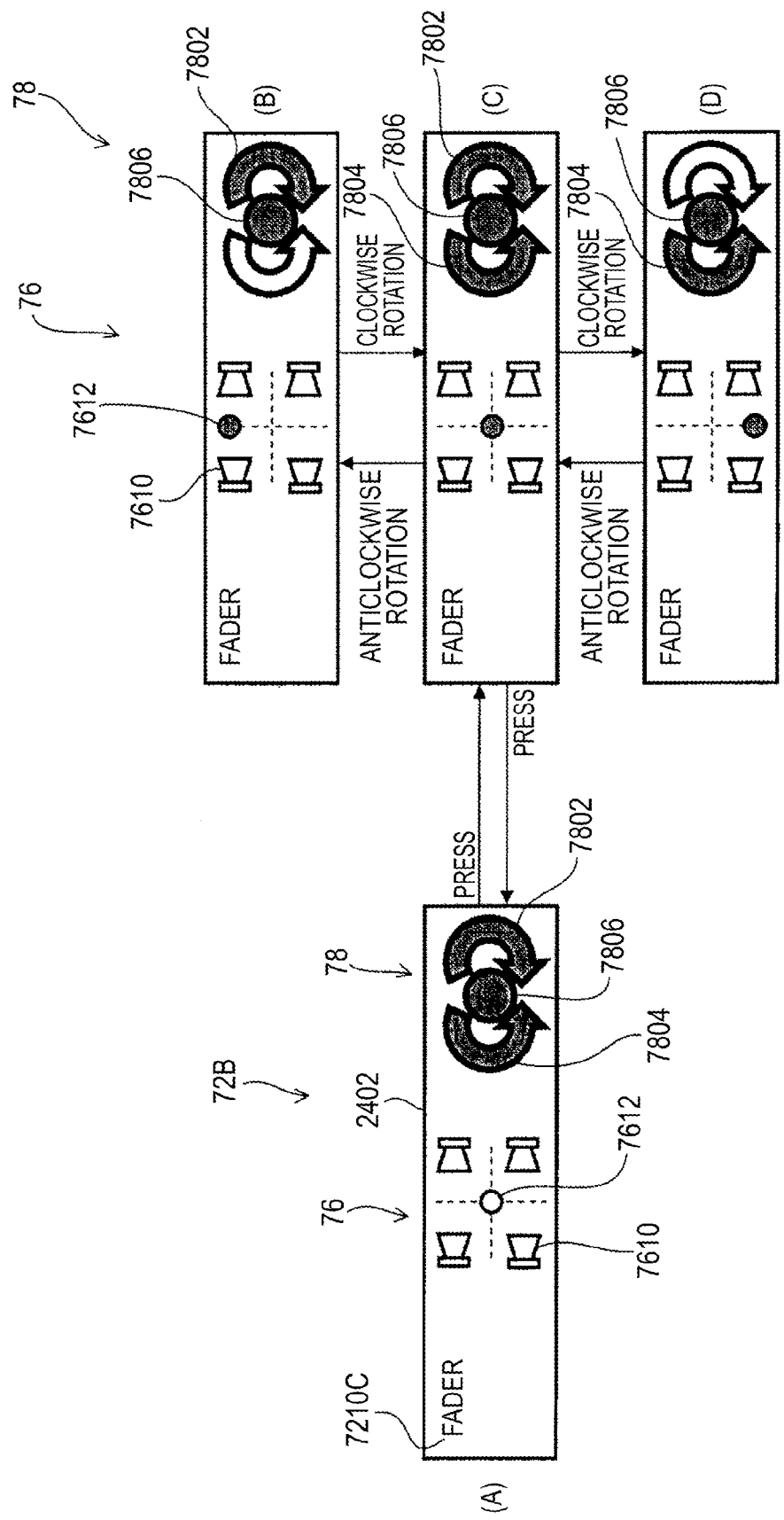
FIG. 9 illustrates switches of a fader setting screen 72C of the main unit sound setting menu screen 72, showing conditions (A) through (D).

As shown in FIG. 9, the fader setting screen 72C includes the setting contents display portion 76 and the operation display portion 78. The figure shows a character 7210C indicating that the fader setting screen 72C is shown on the display screen 2402.

The fader setting screen 72C shows the details of the setting contents of the front-rear sound volume balance.

More specifically, the setting contents display portion 76 shows the setting contents of the front-rear sound volume balance on the fader setting screen 72C by using the setting icon 7610 having a shape of four speakers on the front, rear, left, and right, and the setting icon 7612 representing the sound volume balance.

A condition (A) in FIG. 9 indicates that the setting icon 7612 representing the sound volume balance is not shown on the setting contents display portion 76.

The condition not showing the setting icon 7612 representing the sound volume balance indicates that not the parameter selection screen of the front-rear sound volume balance but the main unit sound setting menu screen 72 is being selected, that is, that the three screens of the DSO setting screen 72A, the balance setting screen 72B, and the fader setting screen 72C are being selected.

Each of conditions (B), (C), and (D) in FIG. 9 shows the display condition of the setting icon 7612 representing the sound volume balance on the setting contents display portion 76.

The display of the setting icon 7612 representing the sound volume balance in this manner indicates that the sound volume balance control setting is effective.

As shown in the conditions (B), (C), and (D) in FIG. 9, the front-rear sound volume balance is indicated by the position of the setting icon 7612 representing the sound volume balance in the front-rear direction and displayed on the fader setting screen 72C.

The display contents of the operation display portion 78 are similar to those shown in FIG. 7.

When the dial 20 is pressed in the display condition of the condition (A) in FIG. 9, the condition switches to the display condition of the condition (C) in FIG. 9. In this case, the sound volume balance indicated by the setting icon 7612 representing the sound volume balance is positioned at the center.

The display condition of the condition (C) in FIG. 9 shows that all of the three operations of the clockwise rotation operation, the anticlockwise rotation operation, and the press operation of the dial 20 are effective.

When the dial 20 is pressed in this condition, the sound volume balance positioned at the center is set.

When the dial 20 is rotated clockwise in the display condition of the condition (C) in FIG. 9, the condition switches to the display condition of the condition (D) in FIG. 9. In this case, the sound volume balance indicated by the setting icon 7612 representing the sound volume balance is positioned on the rear side.

The display condition of the condition (D) in FIG. 9 indicates that the two operations of the anticlockwise rotation operation and the press operation are effective.

When the dial 20 is pressed in this condition, the sound volume balance positioned on the rear side is set.

When the dial 20 is rotated anticlockwise, the condition switches to the display condition of the condition (C) in FIG. 9.

When the dial 20 is rotated anticlockwise in the display condition of the condition (C) in FIG. 9, the condition switches to the display condition of the condition (B) in FIG. 9. In this case, the sound volume balance indicated by the setting icon 7612 representing the sound volume balance is positioned on the front side.

The display condition of the condition (B) in FIG. 9 indicates that the two operations of the clockwise rotation operation and the press operation are effective.

When the dial 20 is pressed in this condition, the sound volume balance positioned on the front side is set.

When the dial 20 is rotated clockwise, the condition switches to the display condition of the condition (C) in FIG. 9.

As explained above, the first guide screen for guiding the effective operation method of the second main unit operation member 18 (operation display portion 78) is displayed on the display screen 2402 when the first main unit operation member (menu button 2618) is operated.

That is, the effective operation and the ineffective operation for the second main unit operation member 18 are guided by display and non-display of the respective icons 7802, 7804, and 7806 shown on the operation display portion 78 of the main unit sound setting menu screen 72.

(Remote Controller Sound Setting Menu Screen 82)

The operation under display of the remote controller sound setting menu screen 82 is now explained.

Figure 10:
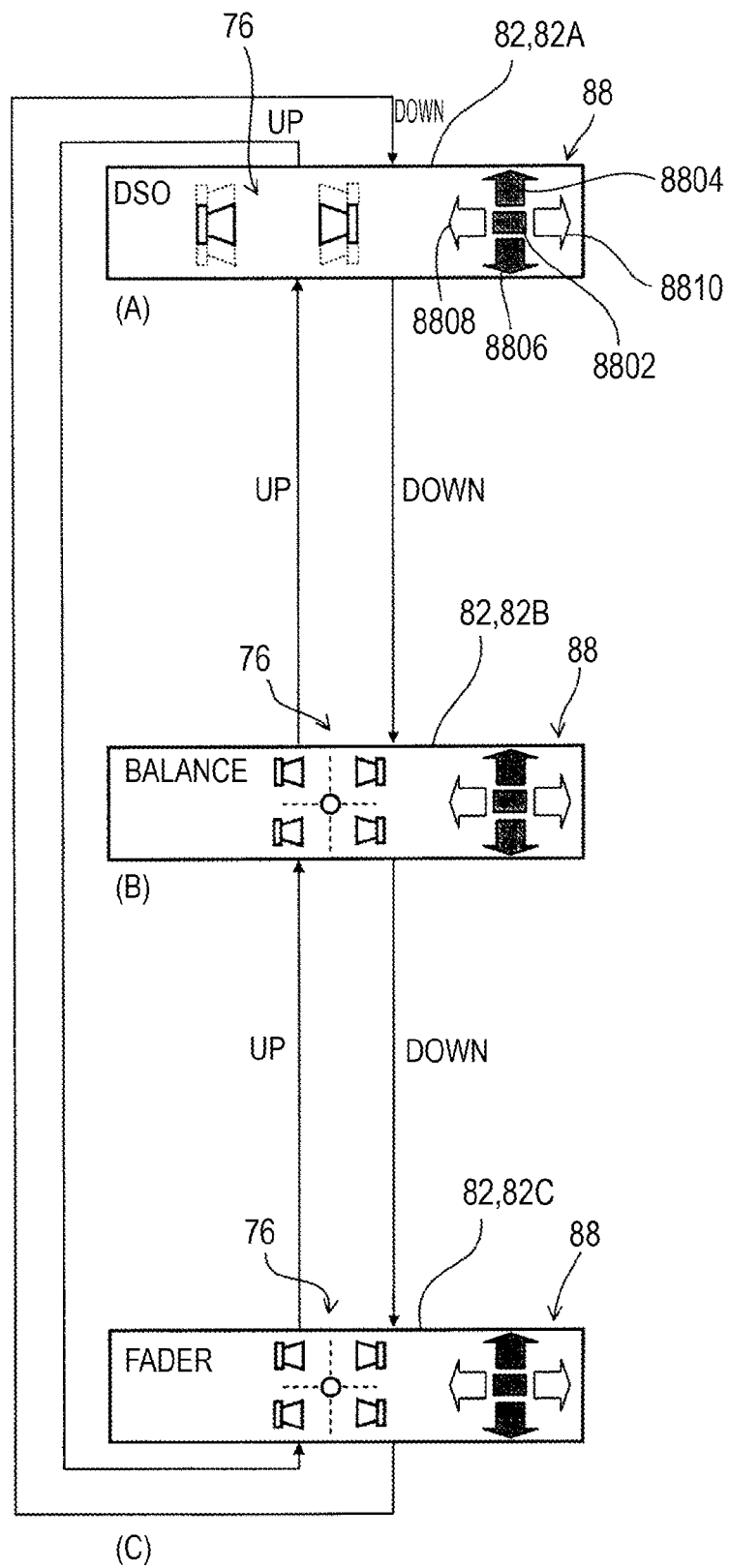
FIG. 10 illustrates switches of the remote controller sound setting menu screen 82, showing conditions (A) through (C).

As shown in FIG. 10, the remote controller sound setting menu screen 82 includes three screens of a (A) DSO setting screen 82A, a (B) balance setting screen 82B, and a (C) fader setting screen 82C.

According to this embodiment, the main unit control section 42 displays the DSO setting screen 82A on the display screen 2402 as the main unit sound setting menu screen 82 when detecting press of the menu button 6216 on the remote controller 46 via the reception section 40.

(DSO Setting Screen 82A)

Initially, the DSO setting screen 82A is explained.

The DSO setting screen 82A is a screen for determining setting associated with sound field correction similar to that of the DSO setting screen 72A shown in FIG. 6.

More specifically, the DSO setting screen 82A is a screen for setting three levels of the effect of the sound field correction.

Figure 11:
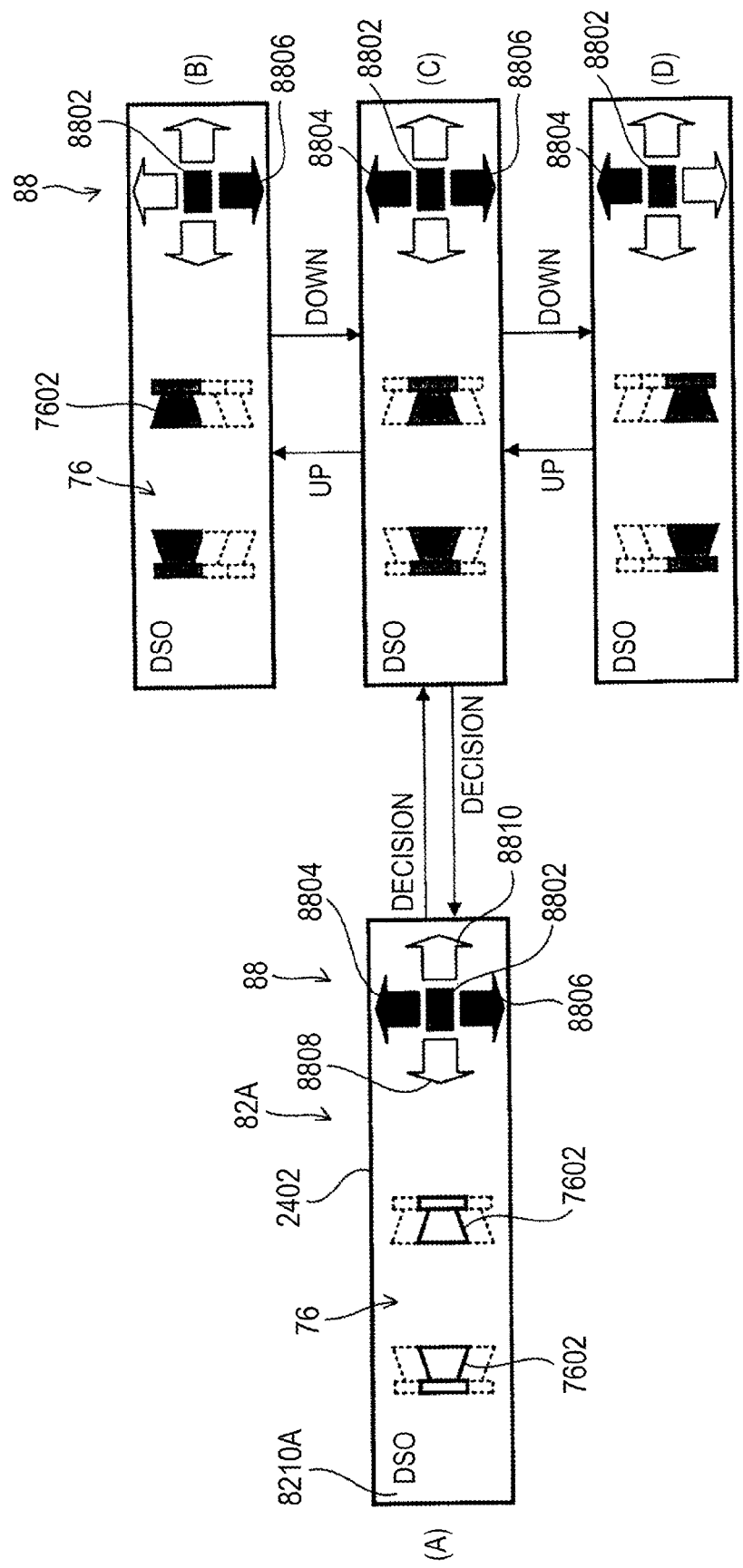
FIG. 11 illustrates switches of a DSO setting screen 82A of the remote controller sound setting menu screen 82, showing conditions (A) through (D).

As shown in FIG. 11, the DSO setting screen 82A includes the setting contents display portion 76 and an operation display portion 88. The figure shows a character 8210A indicating that the DSO setting screen 82A is displayed on the display screen 2402.

The DSO setting screen 82A shows the details of the setting contents of the sound field correction.

The display contents of the setting contents display portion 76 on the remote controller sound setting menu screen 82 are similar to those of the setting contents display portion 76 described with reference to FIGS. 6 through 9. Thus, the same explanation of the setting contents display portion 76 is not repeated herein.

The operation display portion 88 indicates which of press operations corresponding to the five operation buttons of the decision button 52, the up-arrow button 54, the down-arrow button 56, the left-arrow button 58, and the right button 60 is effective as the operation method of the second remote controller operation member 50.

More specifically, a decision icon 8802, an up-arrow icon 8804, a down-arrow icon 8806, a left-arrow icon 8808, and a right-arrow icon 8810 corresponding to the decision button 52, the up-arrow button 54, the down-arrow button 56, the left-arrow button 58, and the right-arrow button 60, respectively, are provided.

Which of the press operations corresponding to the five operation buttons 52, 54, 56, 58, and 60 is effective is indicated by using the five icons.

More specifically, the operation of the second remote controller operation member 50 corresponding to the shown icon of the five icons on the operation display portion 88 is effective, and the operation of the second remote controller operation member 50 corresponding to the not-shown icon is ineffective.

In FIGS. 10 through 13, the hatched icons 8802, 8804, 8806, 8808, and 8810 indicate that they are shown, and the not-hatched icons 8802, 8804, 8806, 8808, and 8810 indicate that they are not shown.

Thus, when the decision icon 8802 is shown, the press operation of the decision button 52 is effective.

When the up-arrow icon 8804 is shown, the press operation of the up-arrow button 54 is effective.

When the down-arrow icon 8806 is shown, the press operation of the down-arrow button 56 is effective.

When the left-arrow icon 8808 is shown, the press operation of the left-arrow button 58 is effective.

When the right-arrow icon 8810 is shown, the press operation of the right-arrow button 60 is effective.

When the decision button 52 is pressed under the display condition of a condition (A) in FIG. 11, the condition switches to the display condition of a condition (C) in FIG. 11. In this case, the level of the sound field correction effect shown by the setting icon 7602 is "middle".

In the display condition of the condition (C) in FIG. 11, the three operations of the decision button 52, the up-arrow button 54, and the down-arrow button 56 are effective.

When the decision button 52 is pressed in this condition, the level of the sound field correction effect is set at "middle".

When the decision button 52 is pressed in the display condition of the condition (C) in FIG. 11, the condition switches to the display condition of a condition (D) in FIG. 11. In this case, the level of the sound field correction effect shown by the setting icon 7602 is "low".

In the display condition of the condition (D) in FIG. 11, the two operations of the decision button 52 and the up-arrow button 54 are effective.

When the decision button 52 is pressed in this condition, the sound field correction effect is set at "low".

When the up-arrow button 54 is pressed, the condition switches to the display condition of the condition (C) in FIG. 11.

When the up-arrow button 54 is pressed in the display condition of the condition (C) in FIG. 11, the condition switches to the display condition of a condition (B) in FIG. 11. In this case, the level of the sound field correction effect indicated by the setting icon 7602 is "high".

The display condition of the condition (B) in FIG. 11 indicates that the two operations of the decision button 52 and the down-arrow button 56 are effective.

When the decision button 52 is pressed in this condition, the sound filed correction effect is set at "high".

When the down-arrow button 56 is pressed, the condition switches to the display condition of the condition (C) in FIG. 11.

(Balance Setting Screen 82B)

The balance setting screen 82B is now explained.

When the down-arrow button 56 is pressed under the condition that the three icons 8802, 8804, and 8806 are shown on the DSO setting screen 82A, the screen display switches from the DSO setting screen 82A to the balance setting screen 82B.

When the up-arrow button 54 is pressed under the condition that the three icons 8802, 8804, and 8806 are all shown on the balance setting screen 82B, the screen display switches from the balance setting screen 82B to the DSO setting screen 82A.

The balance screen 82B is a screen for setting the left-right sound volume balance similarly to the balance setting screen 72B shown in FIG. 7.

More specifically, the balance setting screen 82B is a screen for controlling the left-right sound volume balance and setting the controlled balance. The left-right sound volume balance may be controlled in three levels or more, or may be controlled with no step.

Figure 12:
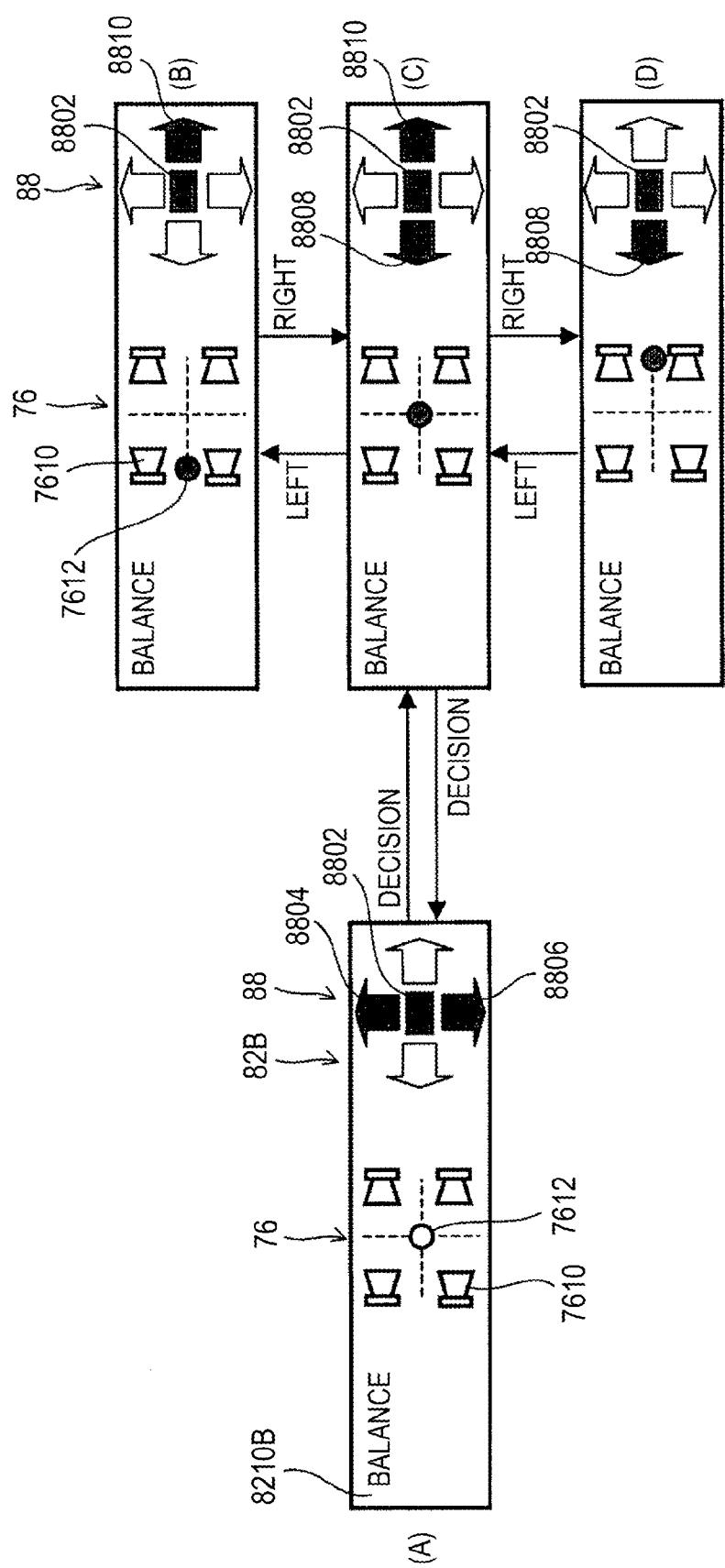
FIG. 12 illustrates switches of a balance setting screen 82B of the remote controller sound setting menu screen 82, showing conditions (A) through (D).

As shown in FIG. 12, the balance setting screen 82B includes the setting contents display portion 76 and the operation display portion 88.

The balance setting screen 82B is a screen for showing the details of the setting contents of the left-right sound volume balance. The figure shows a character 8210B indicating that the balance setting screen 82B is shown on the display screen 2402.

The display contents of the operation display portion 88 are similar to those shown in FIG. 11.

When the decision button 52 is pressed in the display condition of a condition (A) in FIG. 12, the condition switches to the display condition of a condition (C) in FIG. 12. In this case, the sound volume balance indicated by the setting icon 7612 representing the sound volume balance is positioned at the center.

The display condition of the condition (C) in FIG. 12 shows that the three operations of the decision button 52, the left-arrow button 58, and the right-arrow button 60 are effective.

When the decision button 52 is pressed in this condition, the sound volume balance positioned at the center is set.

When the right-arrow button 60 is pressed in the display condition of the condition (C) in FIG. 12, the condition switches to the display condition of a condition (D) in FIG. 12. In this case, the sound volume balance indicated by the setting icon 7612 representing the sound volume balance is positioned on the right side.

The display condition of the condition (D) in FIG. 12 indicates that the two operations of the decision button 52 and the left-arrow button 58 are effective.

When the decision button 52 is pressed in this condition, the sound volume balance positioned on the right side is set.

When the left-arrow button 58 is pressed, the condition switches to the display condition of the condition (C) in FIG. 12.

When the decision button 52 is pressed in the display condition of the condition (C) in FIG. 12, the condition switches to the display condition of a condition (B) in FIG. 12. In this case, the sound volume balance indicated by the setting icon 7612 representing the sound volume balance is positioned on the left side.

The display condition of the condition (B) in FIG. 12 indicates that the two operations of the decision button 52 and the right-arrow button 60 are effective.

When the decision button 52 is pressed in this condition, the sound volume balance positioned on the left side is set.

When the right-arrow button 60 is pressed, the condition switches to the display condition of the condition (C) in FIG. 12.

(Fader Setting Screen 82C)

The fader setting screen 82C is now explained.

When the down-arrow button 56 is pressed under the condition that all of the three icons 8802, 8804, and 8806 are shown on the balance setting screen 82B, the screen display switches from the balance setting screen 82B to the fader setting screen 82C as shown in FIG. 10.

When the up-arrow button 54 is pressed under the condition that all of the three icons 8802, 8804, and 8806 are shown on the fader setting screen 82C, the screen display switches from the fader setting screen 82C to the balance setting screen 82B.

When the down-arrow button 56 is pressed under the condition that all of the three icons 8802, 8804, and 8806 are shown on the fader setting screen 82C, the screen display switches from the fader setting screen 82C to the DSO setting screen 82A.

The fader setting screen 82C is a screen for setting the front-rear sound volume balance similarly to the fader setting screen 72C in FIG. 8.

More specifically, the fader setting screen 82C is a screen for controlling the front-rear sound volume balance and setting the controlled sound volume balance. The front-rear sound volume balance may be controlled in three levels or more, or may be controlled with no step.

Figure 13:
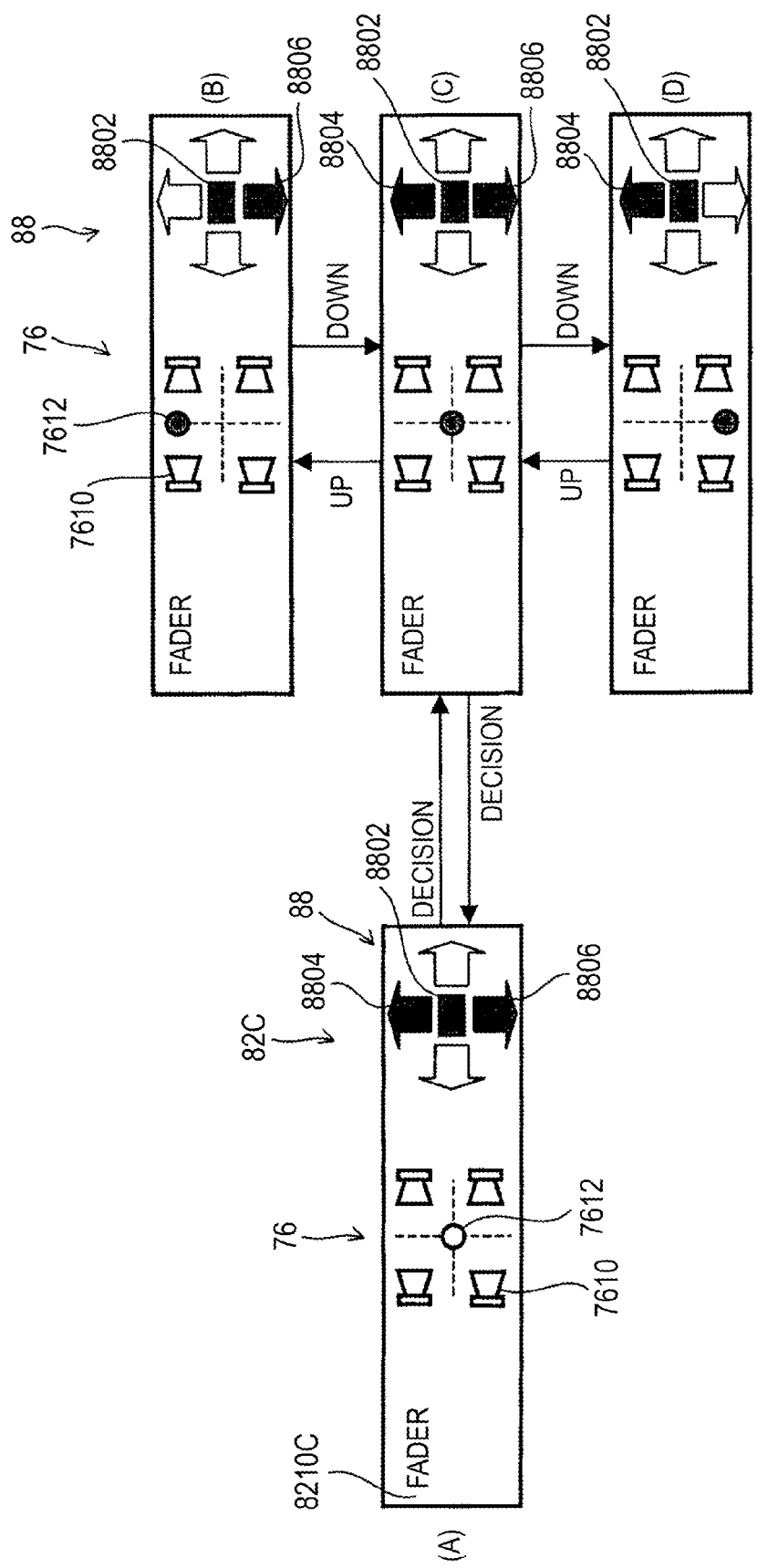
FIG. 13 illustrates switches of a fader setting screen 82C of the remote controller sound setting menu screen 82, showing conditions (A) through (D).

As shown in FIG. 13, the fader setting screen 82C includes the setting contents display portion 76 and the operation display portion 88.

The fader setting screen 82C shows the details of the setting contents of the front-rear sound volume balance. The figure shows a character 8210C indicating that the balance setting screen 82B is shown on the display screen 2402.

The setting contents display portion 76 shows the setting contents of the front-rear sound volume balance on the fader setting screen 82C by using the setting icon 7610 having a shape of four speakers on the front, rear, left, and right, and the setting icon 7612 representing the sound volume balance.

The display contents of the operation display portion 88 are similar to those shown in FIG. 11.

When the decision button 52 is pressed in the display condition of a condition (A) in FIG. 13, the condition is switched to the display condition of a condition (C) in FIG. 13. In this case, the sound volume balance indicated by the setting icon 7612 representing the sound volume balance is positioned at the center.

The display condition of the condition (C) in FIG. 13 shows that the three operations of the decision button 52, the up-arrow button 54, and the down-arrow button 56 are effective.

When the decision button 52 is pressed in this condition, the sound volume balance positioned at the center is set.

When the down-arrow button 56 is pressed in the display condition of the condition (C) in FIG. 13, the condition switches to the display condition of a condition (D) in FIG. 13. In this case, the sound volume balance indicated by the setting icon 7612 representing the sound volume balance is positioned on the rear side.

The display condition of the condition (D) in FIG. 13 indicates that the two operations of the decision button 52 and the up-arrow button 54 are effective.

When the decision button 52 is pressed in this condition, the sound volume balance positioned on the rear side is set.

When the up-arrow button 54 is pressed, the condition switches to the display condition of the condition (C) in FIG. 13.

When the up-arrow button 54 is pressed in the display condition of the condition (C) in FIG. 13, the condition switches to the display condition of a condition (B) in FIG. 13. In this case, the sound volume balance indicated by the setting icon 7612 representing the sound volume balance is positioned on the front side.

The display condition of the condition (B) in FIG. 13 indicates that the two operations of the decision button 52 and the down-arrow button 56 are effective.

When the decision button 52 is pressed in this condition, the sound volume balance positioned on the front side is set.

When the down-arrow button 56 is pressed, the condition switches to the display condition of the condition (C) in FIG. 13.

As explained above, the second guide screen for guiding the effective operation method of the second remote controller operation member 50 (operation display portion 88) is displayed on the display screen 2402 when the menu button 6216 as the first remote controller operation member is operated.

That is, the effective operation and the ineffective operation for the second remote controller operation member 50 are guided by display and non-display of the respective icons 8802, 8804, 8806, 8808, and 8810 shown on the operation display portion 88 of the remote controller sound setting menu screen 82.

According to this embodiment, the main unit control section 42 displays the first guide screen for guiding the operation of the main unit operation section on the display screen 2402 as the first guide operation when detecting that the main unit operation section has been operated. On the other hand, the main unit control section 42 displays the second guide screen for guiding the operation of the remote controller 46 on the display screen 2402 as the second guide operation when detecting that the remote controller 46 has been operated.

Thus, a user can accurately operate both the main unit operation section and the remote controller 46 without losing comprehension of the operation method and making errors of the operation. Accordingly, the maneuverability improves.

The main unit operation section is chiefly operated by a driver, and the remote controller 46 is operated by a person sitting on the seat next to the driver or the rear seat.

Thus, the main unit control section 42 can detect which of the main unit operation section and the remote controller 46 has been operated, determine whether the user operating the electronic device 10 is the driver or other person on the car based on the detection result, and perform control operation according to the determination result.

1) Even when a menu screen requiring selection operation is displayed, the screen is switched to a normal screen not particularly requiring operation such as a screen at the time of CD reproduction after elapse of a certain period from operation of the main unit operation section.

When the remote controller 46 is operated, the menu screen requiring selection operation is maintained. In this case, the screen is not switched to the normal screen after elapse of a certain period.

By this method, the burden for the driver for conducting the operation can be reduced, and the operation can be smoothly performed by other person on the car.

2) When the main unit operation section is operated, the number of the selection items listed on the menu screen is decreased such that the selection operation can be simplified.

When the remote controller 46 is operated, the number of the selection items listed on the menu screen is increased such that detailed control can be set.

In the case 2), the burden for the driver for conducting the operation can be reduced, and the operation can be smoothly performed by other person on the car similarly to the case 1).

3) When the remote controller 46 is operated, the sizes of the characters and icons representing the selection items listed on the menu screen are made larger than those shown when the main unit operation section is operated.

By this method, visibility of the display screen 2402 can be improved for both the driver and the person on the other seat, and the operation can be smoothly performed.

While the electronic device 10 as a car audio unit has been discussed in this embodiment, the electronic device 10 may be various types of electronic device which can be controlled by a remote controller such as a stationary audio unit as well as the electronic device mounted on a car.

According to this embodiment, the electronic device 10 is controlled by the remote controller 46 using wireless signals. However, the remote controller may a wire type controller.

According to this embodiment, one type of the remote controller 46 is used. However, it is obvious that the invention is applicable to the electronic device 10 operable by remote control using two or more types of remote controller operated by different operation methods.

The present application contains subject matter related to that disclosed in Japanese Priority Patent Application JP 2009-035757 filed in the Japan Patent Office on Feb. 18, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
   a main unit operable by remote control using a remote controller, comprising
      a display section having a display screen,
      a main unit operation section to perform input operation, and
      a main unit control section to perform both control operation corresponding to an operation of the main unit operation section and control operation corresponding to an operation of the remote controller,
   wherein the main unit control section displays a first guide screen for guiding the operation of the main unit operation section on the display screen as a first guide operation in response to detecting that the main unit operation section has been operated, and displays a second guide screen for guiding the operation of the remote controller on the display screen as a second guide operation in response to detecting that the remote controller has been operated, and
   wherein:
      the main unit control section displays as the first guide screen, in response to detecting that the main unit operation section has been operated, a screen describing how to operate the main unit operation section; and
      the main unit control section displays as the second guide screen, in response detecting that the remote controller has been operated, a screen describing how to operate the remote controller,
   the screen describing how to operate the main unit operation section including at least one graphic relating to operation of the main unit operation section that is not included in the screen describing how to operate the remote controller, and
   wherein:
      the main unit control section displays, when detecting that the main unit operation section has been operated, the first guide screen describing how to provide an input to the main unit via the main unit operation section to trigger performance of a control operation; and
      the main unit control section displays, when detecting that the remote controller has been operated, the second guide screen describing how to provide the input to the main unit via the remote controller to trigger performance of the control operation.

2. The electronic device according to claim 1, wherein the remote controller comprises
   a remote controller operation section to perform input operation, and
   a remote controller control section to produce a remote control signal corresponding to the operation of the remote controller operation section and supplies the remote control signal to the main unit control section;
   wherein the detection that the remote controller has been operated corresponds to detection that the remote controller operation section has been operated; and
   wherein the guide of the operation of the remote controller corresponds to guide of the operation of the remote controller operation section.

3. The electronic device according to claim 1, wherein the main unit operation section comprises
   a first main unit operation member to display a menu screen listing various setting items on the display section, and
   a second main unit operation member to select an item from the respective setting items listed on the menu screen; and
   wherein a detected operation of the main unit operation section corresponds to operation of the first main unit operation member.

4. The electronic device according to claim 1, wherein the remote controller comprises
   a first remote controller operation member to display a menu screen listing various setting items on the display section, and
   a second remote controller operation member to select an item from the respective setting items listed on the menu screen; and
   wherein a detected operation of the remote controller corresponds to operation of the first remote controller operation member.

5. The electronic device according to claim 4, wherein each of the first remote controller operation member and the second remote controller operation member has a press button.

6. The electronic device according to claim 1, wherein:
   the main unit control section displays, when detecting that the main unit operation section has been operated, the first guide screen illustrating how to operate the main unit operation section to provide the input; and
   the main unit control section displays, when detecting that the remote controller has been operated, the second guide screen illustrating how to operate the remote controller to provide the input.

7. A method of operating an electronic device, the electronic device comprising a display and an operation section, the electronic device being configured to receive input via the operation section and a remote controller, the method comprising:
   in response to detecting a user interaction with the operation section, displaying on the display a first guide screen describing how to provide, to the electronic device via the operation section, an input to trigger the electronic device to perform a control operation; and
   in response to detecting a user interaction with the remote controller, displaying on the display a second guide screen describing how to provide, to the electronic device via the remote controller, the input to trigger the electronic device to perform the control operation,
   wherein the first guide screen describing how to provide the input via the operation section includes at least one first graphic relating to operation of the operation section, the at least one first graphic not being included in the second guide screen, and
   wherein the second guide screen describing how to provide the input via the remote controller includes at least one second graphic relating to operation of the remote controller, the at least one second graphic not being included in the first guide screen.

8. The method of claim 7, wherein:

displaying the first guide screen comprises displaying a guide screen illustrating how to provide the input via the operation section; and displaying the second guide screen comprises displaying a guide screen illustrating how to provide the input via the remote controller.

* * * * *